No. 836,541. PATENTED NOV. 20, 1906.
T. SPRIGGS.
HAY KNIFE.
APPLICATION FILED MAR. 30, 1906.
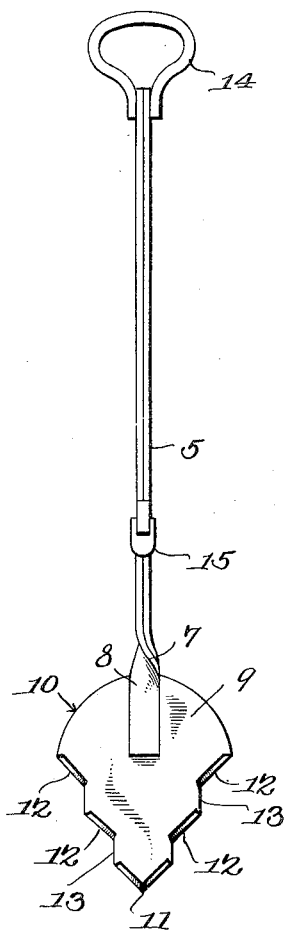
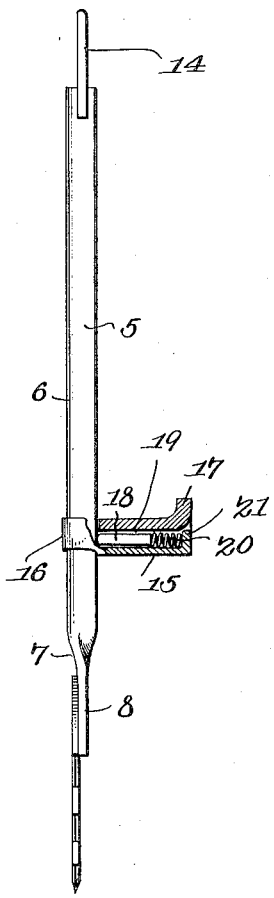
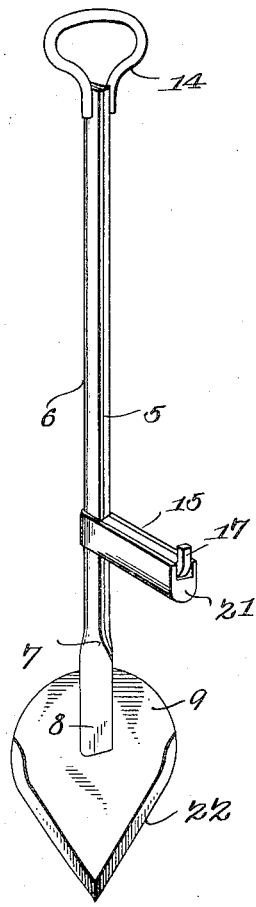
WITNESSES:
Thomas Spriggs, INVENTOR.
By C. A. Snow & Co.
ATTORNEYS

UNITED STATES PATENT OFFICE.

THOMAS SPRIGGS, OF LITTLE RIVER, KANSAS, ASSIGNOR OF ONE-HALF TO WILLIAM G. GREENBANK, OF LITTLE RIVER, KANSAS.

HAY-KNIFE.

No. 836,541.     Specification of Letters Patent.     Patented Nov. 20, 1906.

Application filed March 30, 1906. Serial No. 308,984.

*To all whom it may concern:*

Be it known that I, THOMAS SPRIGGS, a citizen of the United States, residing at Little River, in the county of Rice and State of Kansas, have invented a new and useful Hay-Knife, of which the following is a specification.

This invention relates to hay-knives, and has for its object to provide a comparatively simple and inexpensive device of this character by means of which wet or dry hay may be readily cut or severed from the stack.

A further object of the invention is to provide a knife having corrugated or stepped cutting edges terminating in a spear-point, whereby the knife may be readily driven into the hay and the latter cut or severed clean from the ground without danger of dulling said edges.

A further object is to provide a knife having a foot-rest or step slidably mounted on the shank of the tool and capable of being adjusted vertically of the shank to vary the depth of cut of the knife.

A still further object is to generally improve this class of devices, so as to increase their utility, durability, and efficiency, as well as to reduce the cost of manufacture.

With these and other objects in view the invention consists in the construction and novel combination and arrangement of parts hereinafter fully described, and illustrated in the accompanying drawings, it being understood that various changes in form, proportions, and minor details of construction may be resorted to within the scope of the appended claims.

In the accompanying drawings, forming a part of this specification, Figure 1 is a side elevation of a hay-knife constructed in accordance with my invention. Fig. 2 is an end view of the same. Fig. 3 is a perspective view illustrating a modified form of the invention.

Similar numerals of reference indicate corresponding parts in all of the figures of the drawings.

The improved device comprises a shank or standard 5, preferably formed of a single strip of metal bent upon itself, as indicated at 6, and having its lower end twisted at 7 to produce a flat extension 8 for attachment to a cutting-blade 9. The fixed end of the cutting-blade is curved or rounded, as indicated at 10, while the free end thereof terminates in a spear-point 11, said knife being provided with step cutting edges 12, inclined to the longitudinal axis of the blade and spaced apart by vertical walls 13.

By having the cutting edges formed in the manner described the tool may be readily driven into the hay and the latter cut or severed without danger of dulling the cutting edges.

Secured to the free end of the shank 5 is a handle 14, and slidably mounted on said shank is an adjustable foot-rest or step 15. The foot-rest 15 is provided at one end thereof with a loop or strap 16, adapted to receive the shank 5, and at its opposite end with a vertically-disposed lug or projection 17, designed to prevent accidental displacement of the foot of the operator when manipulating the tool. As a means for adjusting the step of the shank 5 there is provided a locking-bolt 18, slidably mounted in a recess 19 formed in the step and normally held in engagement with the shank 5 by means of a coiled spring 20, interposed between the bolt 19 and the end of the casing 21, as shown.

In using the implement the foot-rest is adjusted vertically of the shank 5 to regulate the depth of cut of the knife by tilting the loop or strap 16 with the foot and sliding the same up or down, as the case may be, said step being locked into adjusted position by the clamping action of the spring-pressed bolt 19. The operator then grasps the handle 14 and drives the implement into the hay by exerting a downward pressure on the foot-rest or step, thus cutting or severing the hay and permitting the same to be detached from the stack. In Fig. 3 of the drawings there is illustrated a modified form of the invention, in which the blade or knife 9 is formed with a continuous knife-edge 22, the tool being otherwise substantially the same as that shown in Fig. 1 of the drawings.

From the foregoing description it will be seen that there is provided a strong durable implement admirably adapted for the attainment of the ends in view.

Having thus described the invention, what is claimed is—

1. A hay-knife comprising a shank, and a substantially triangular-shaped cutting-blade secured to the shank and provided with oppositely-disposed stepped cutting edges inclined to the longitudinal axis of the blade.

2. A hay-knife comprising a shank, and a substantially triangular-shaped cutting-blade secured to the shank and having its opposite edges provided with shearing members disposed in stepped relation.

3. A hay-knife comprising a shank, and a substantially triangular-shaped cutting-blade secured to the shank and having its opposite edges provided with stepped cutting members inclined to the longitudinal axis of the blade and connected by vertical walls some of which terminate in a spear-point at the apex of the cutting-blade.

4. A hay-knife comprising a shank, a substantially triangular-shaped cutting-blade having its upper portion curved and secured to the shank and having its opposite end terminating in the spear-point, said blade being provided with stepped shearing edges spaced apart by vertical walls and inclined to the longitudinal axis of the blade.

5. A hay-knife comprising a shank, a substantially triangular-shaped cutting-blade secured to the shank and having its opposite edges provided with stepped cutting members, a foot-rest slidably mounted on the shank and a spring locking-bolt adapted to engage the shank for locking the foot-rest in adjusted position.

6. A hay-knife comprising a shank, a substantially triangular-shaped cutting-blade secured to the shank and having its opposite side faces flat and unobstructed and its opposite edges provided with stepped cutting members inclined to the longitudinal axis of the blade, a foot-rest slidably mounted on the shank, and a spring locking-bolt adapted to engage the shank for locking the rest in adjusted position.

7. A hay-knife comprising a shank, formed of a single piece of metal bent upon itself and twisted at one end to form a flat terminal extension, a cutting-blade secured to the extension, a foot-rest slidably mounted on the shank and consisting of a casing having one end thereof provided with a loop for the reception of the shank and the opposite end thereof provided with vertically-disposed lugs, a locking-bolt carried by the casing and adapted to engage the shank for locking the foot-rest in adjusted position, and a spring interposed between the locking-bolt and the adjacent wall of the casing.

8. A hay-knife comprising a shank, a substantially triangular-shaped cutting-blade having one end thereof rounded and its opposite end terminating in a spear-point, said blade being formed with stepped shearing edges spaced apart by vertical walls, a foot-rest slidably mounted on the shank, and means for locking the foot-rest in adjusted position.

In testimony that I claim the foregoing as my own I have hereto affixed my signature in the presence of two witnesses.

THOMAS SPRIGGS.

Witnesses:
JNO. CLUTTER,
A. A. CRANDALL.